United States Patent
Zieder et al.

(10) Patent No.: US 9,921,948 B2
(45) Date of Patent: Mar. 20, 2018

(54) SOFTWARE COMMIT RISK LEVEL

(71) Applicant: HEWLETT PACKARD ENTERPRISE DEVELOPMENT LP, Houston, TX (US)

(72) Inventors: Gil Zieder, Yehud (IL); Boris Kozorovitzky, Yehud (IL); Ofer Eliassaf, Yehud (IL); Efrat Egozi Levi, Yehud (IL); Ohad Assulin, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/028,725

(22) PCT Filed: Oct. 30, 2013

(86) PCT No.: PCT/US2013/067488
§ 371 (c)(1),
(2) Date: Apr. 12, 2016

(87) PCT Pub. No.: WO2015/065367
PCT Pub. Date: May 7, 2015

(65) Prior Publication Data
US 2016/0239402 A1    Aug. 18, 2016

(51) Int. Cl.
*G06F 9/44*    (2006.01)
*G06F 9/45*    (2006.01)
(Continued)

(52) U.S. Cl.
CPC .............. *G06F 11/368* (2013.01); *G06F 8/20* (2013.01); *G06F 8/60* (2013.01); *G06F 8/65* (2013.01);
(Continued)

(58) Field of Classification Search
CPC ..... G06F 8/20; G06F 8/65; G06F 8/64; G06F 8/60; G06F 8/71; G06F 8/75; G06F 9/445; G06F 17/30884; G06F 11/36; G06F 11/3616; G06F 11/3604; G06F 11/3688; G06F 11/3466; G06F 11/008;
(Continued)

(56) References Cited

U.S. PATENT DOCUMENTS 6,219,805 B1 * 4/2001 Jones ................. G06F 11/3616
714/25
6,895,577 B1 * 5/2005 Noble ................ G06F 11/3676
714/38.12
(Continued)

OTHER PUBLICATIONS

Will Snipes et al., Code Hot Spot: A Tool for Extraction and Analysis of Code Change History, IEEE 978-1-4577-0664-6/11, 2011, [Retrieved on Oct. 19, 2017]. Retrieved from the internet: <URL: http://ieeexplore.ieee.org/stamp/stamp.jsp?arnumber=6080806> 10 Pages (392-401).*
(Continued)

*Primary Examiner* — Anibal Rivera

(57) ABSTRACT

A risk level of a software commit is assessed through the use of a classifier. The classifier may be generated based on attributes pertaining to previous commits and used to determine a risk level for deployment of a software commit into a production environment based on attributes extracted from the software commit.

14 Claims, 9 Drawing Sheets

(51) Int. Cl.
*G06F 17/00* (2006.01)
*G06F 11/36* (2006.01)
*G06F 11/30* (2006.01)
*G06F 9/445* (2018.01)
*G06N 99/00* (2010.01)
*G06F 11/00* (2006.01)
*G06F 11/34* (2006.01)
*G06F 17/30* (2006.01)

(52) U.S. Cl.
CPC .............. *G06F 8/71* (2013.01); *G06F 11/008* (2013.01); *G06F 17/30377* (2013.01); *G06N 99/005* (2013.01); *G06F 11/3466* (2013.01); *G06F 11/3604* (2013.01); *G06F 11/3616* (2013.01); *G06F 17/30884* (2013.01)

(58) Field of Classification Search
CPC .............. G06F 11/3672; G06F 11/1479; G06F 11/3051; G06F 11/3676; G06F 19/3456; G06Q 10/06; G06Q 10/04; G06Q 10/00; G06Q 10/0635; G06Q 10/10; G06Q 10/06393
See application file for complete search history.

(56) References Cited

U.S. PATENT DOCUMENTS

| | | | | |
|---|---|---|---|---|
| 6,944,759 B1* | 9/2005 | Crisan | G06F 8/64 | 702/123 |
| 7,487,545 B2* | 2/2009 | Hall | G06F 21/577 | 714/38.1 |
| 7,707,265 B2* | 4/2010 | Gibson | G06F 17/30884 | 709/203 |
| 7,757,125 B2* | 7/2010 | Bassin | G06F 11/3616 | 702/185 |
| 8,255,362 B2* | 8/2012 | Johnson | G06F 8/65 | 707/625 |
| 8,572,679 B1* | 10/2013 | Wang | G06F 8/65 | 370/328 |
| 8,584,079 B2* | 11/2013 | Yassin | G06F 11/3672 | 717/101 |
| 8,589,203 B1* | 11/2013 | Collins | G06Q 10/00 | 705/7.12 |
| 8,627,287 B2* | 1/2014 | Fanning | G06F 8/75 | 717/124 |
| 9,354,867 B2* | 5/2016 | Jain | G06F 8/70 | |
| 9,395,979 B1* | 7/2016 | Bullukian | G06F 8/71 | |
| 9,558,464 B2* | 1/2017 | Bassin | G06F 11/008 | |
| 9,785,430 B2* | 10/2017 | Viswanathan | G06F 8/71 | |
| 2005/0114829 A1* | 5/2005 | Robin | G06Q 10/06 | 717/101 |
| 2005/0283751 A1* | 12/2005 | Bassin | G06Q 10/06 | 717/100 |
| 2005/0289503 A1* | 12/2005 | Clifford | G06Q 10/06 | 717/101 |
| 2006/0107121 A1* | 5/2006 | Mendrala | G06F 11/3688 | 714/38.1 |
| 2006/0161879 A1* | 7/2006 | Lubrecht | G06Q 10/06 | 717/101 |
| 2007/0033445 A1* | 2/2007 | Hirsave | G06F 11/3466 | 714/47.1 |
| 2007/0038977 A1* | 2/2007 | Savage | G06F 8/20 | 717/106 |
| 2007/0157195 A1* | 7/2007 | Gaa-Frost | G06F 8/60 | 717/174 |
| 2007/0260607 A1* | 11/2007 | Hajdukiewicz | G06Q 10/06 | |
| 2007/0288923 A1* | 12/2007 | Nishikawa | G06F 19/3456 | 718/100 |
| 2008/0034258 A1* | 2/2008 | Moriya | G05B 19/4184 | 714/57 |
| 2008/0077530 A1* | 3/2008 | Banas | G06Q 10/06 | 705/50 |
| 2008/0201611 A1* | 8/2008 | Bassin | G06F 11/3604 | 714/37 |
| 2008/0201612 A1* | 8/2008 | Bassin | G06F 11/3616 | 714/38.13 |
| 2008/0263534 A1* | 10/2008 | Hirsave | G06F 21/577 | 717/168 |
| 2009/0144698 A1* | 6/2009 | Fanning | G06F 8/75 | 717/120 |
| 2009/0204946 A1* | 8/2009 | Fienblit | G06F 8/71 | 717/124 |
| 2010/0049723 A1* | 2/2010 | Aebig | G06Q 10/10 | 715/212 |
| 2010/0049745 A1* | 2/2010 | Aebig | G06Q 10/10 | 705/7.41 |
| 2010/0049746 A1* | 2/2010 | Aebig | G06Q 10/10 | 705/7.41 |
| 2010/0162200 A1* | 6/2010 | Kamiyama | G06Q 10/06 | 717/101 |
| 2010/0174501 A1* | 7/2010 | Myadam | H04W 8/24 | 702/63 |
| 2010/0293519 A1* | 11/2010 | Groves | G06F 11/3616 | 717/101 |
| 2010/0306732 A1* | 12/2010 | Zhu | G06Q 10/10 | 717/105 |
| 2011/0067005 A1* | 3/2011 | Bassin | G06F 11/008 | 717/127 |
| 2012/0159420 A1* | 6/2012 | Yassin | G06F 11/3672 | 717/101 |
| 2012/0197686 A1* | 8/2012 | Abu El Ata | G06Q 10/06393 | 705/7.39 |
| 2012/0203590 A1* | 8/2012 | Deb | G06Q 10/0635 | 705/7.28 |
| 2012/0291014 A1* | 11/2012 | Shrinivasan | G06F 11/3664 | 717/124 |
| 2013/0006701 A1* | 1/2013 | Guven | G06Q 10/0635 | 705/7.28 |
| 2013/0074038 A1* | 3/2013 | Fox | G06F 8/70 | 717/122 |
| 2013/0204837 A1* | 8/2013 | Sabharwal | G06Q 10/00 | 707/609 |
| 2013/0346956 A1* | 12/2013 | Green | G06F 8/65 | 717/168 |
| 2014/0033176 A1* | 1/2014 | Rama | G06F 11/3688 | 717/124 |
| 2014/0136901 A1* | 5/2014 | Butler | G06F 11/3051 | 714/38.1 |
| 2014/0282406 A1* | 9/2014 | Narasimhan | G06F 11/008 | 717/124 |
| 2016/0092185 A1* | 3/2016 | Botti | G06F 8/60 | 717/103 |
| 2016/0323378 A1* | 11/2016 | Coskun | H04L 67/1095 | |
| 2016/0378618 A1* | 12/2016 | Cmielowski | G06F 11/1479 | 714/38.1 |
| 2017/0169370 A1* | 6/2017 | Cornilescu | G06F 8/71 | |

OTHER PUBLICATIONS

Raimund Moser et al., A Comparative Analysis of the Efficiency of Change Metrics and Static Code Attributes for Defect Prediction, ACM 978-1-60558-079-1, May 10-18, 2008, [Retrieved on Oct. 19, 2017]. Retrieved from the internet: <URL: http://delivery.acm.org/10.1145/1370000/1368114/p181-moser.pdf> 10 Pages (181-190).*
Bhattacharya, P., "Quantitative Decision-making in Software Engineering," (Research Paper), Diss. University of California Riverside, Jun. 2012, 180 pages, available at http://www.cs.ucr.edu/~neamtiu/pubs/dissertation-bhattacharya.pdf.
Eyolfson, J. et al., "Correlations Between Bugginess and Time-based Commit Characteristics," (Research Paper), Empirical Software Engineering 19.4, Apr. 10, 2013, 32 pages, available at https://ece.uwaterloo.ca/~lintan/publications/commitTime-emse13.pdf.
Giger, E. et al., "Method-level Bug Prediction," (Research Paper), Proceedings of the ACM-IEEE International Symposium on Empirical Software Engineering and Measurement, ACM, Sep. 20,

(56) References Cited

OTHER PUBLICATIONS 2012, pp. 171-180, available at https://pdfs.semanticscholar.org/feb5/a1efebae4a349078dde9dea9aac0a020d3e7.pdf.
International Search Report & Written Opinion received in PCT Application No. PCT/US2013/067488, Jul. 23, 2014, 12 pages.
Moser, R. et al., "A Comparative Analysis of the Efficiency of Change Metrics and Static Code Attributes for Defect Prediction," 2008 ACM/IEEE 30th International Conference on Software Engineering, May 2008, pp. 181-190, available at https://hiper.cis.udel.edu/lp/lib/exe/fetch.php/courses/icse08-moser-defectpredict.pdf.
Snipes, W. et al., "Code Hot Spot: A Tool for Extraction and Analysis of Code Change History," (Research Paper), Software Maintenance (ICSM), 27th IEEE International Conference on, Sep. 25, 2011, pp. 392-401, available at http://citeseerx.ist.psu.edu/viewdoc/download?doi=10.1.1.416.9811&rep=rep1&type=pdf.
Synopsys Inc., "Coverity Integrity Control Governs Code Risk From Third Party Suppliers," (Web Page), 2016, 4 pages, available at http://www.coverity.com/press-releases/coverity-integrity-control-governs-code-risk-from-third-party-suppliers/.
Synopsys, Inc., "Coverity Save," (Web Page), 2016, 4 pages, available at http://www.coverity.com/products/coverity-save/.
Synopsys, Inc., "Coverity Test Advisor—Development," (Web Page), 2016, 4 pages, available at http://www.coverity.com/products/test-advisor-development/.
Tarvo, A. et al., "Predicting Risk of Pre-release Code Changes with Checkinmentor," (Research paper), 2013 IEEE 24th International Symposium on Software Reliability Engineering (ISSRE), 2013, pp. 128-137, available at http://cs.brown.edu/~alexta/Doc/pubs/2013_ISSRE_PredictRiskofPreReleaseCodeChanges.pdf.
Wikipedia, "Cyclomatic Complexity," (Web Page), Oct. 24, 2013, 8 pages, available at https://en.wikipedia.org/w/index.php?title=Cyclomatic_complexity&oldid=578592301.
Wikipedia, "Halstead Complexity Measures," (Web Page), Aug. 6, 2013, 3 pages, available at https://en.wikipedia.org/w/index.php?title=Halstead_complexity_measures&oldid=567445559.
Wikipedia, "Maintainability," (Web Page), Aug. 10, 2013, 3 pages, available at https://en.wikipedia.org/w/index.php?title=Maintainability&oldid=567944596.
Wikipedia, "Source Line of Code," (Web Page), Oct. 24, 2013, 9 pages, available at https://en.wikipedia.org/w/index.php?title=Source_lines_of_code&oldid=578535056.

\* cited by examiner

SOFTWARE COMMIT RISK LEVEL

CROSS-REFERENCE TO RELATED APPLICATION

This application is a U.S. National Stage Application of and claims priority to international Patent Application No. PCT/US2013/067488, filed on Oct. 30, 2013, and entitled "SOFTWARE COMMIT RISK LEVEL," the entire content of which is hereby incorporated in its entirety.

BACKGROUND

With the advent of on-line services, executable software often is available 24 hours per day, every day. Any changes or improvements to the software should function correctly when released into the production version of the software. The continuous availability of software code creates a stress point on the ability to test the code.

BRIEF DESCRIPTION OF THE DRAWINGS

For a detailed description of various examples, reference will now be made to the accompanying drawings in which.

DETAILED DESCRIPTION

As used herein, the term "code" refers to all files related to an executable application. For example, code may be executable software itself (e.g., source or object code) as well as various files used by the executable code such as images, documentation, etc.

Figure 1:
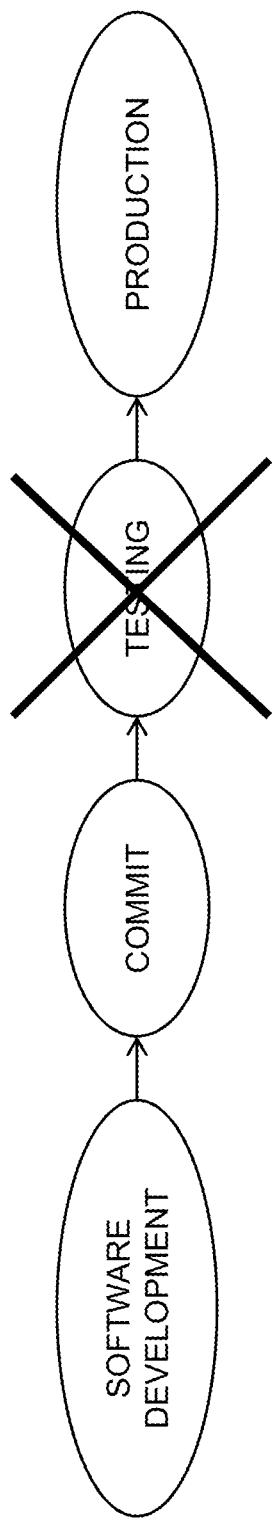
FIG. 1 illustrates a software generation cycle in accordance with an example.

A model of a software code's creation cycle is illustrated in FIG. 1. The code is developed by software programmers during a software development stage. Then, the code is "committed" which means that the software programmer releases the code for testing. A "software commit" (or simply "commit") refers to code that has been written by a programmer, but has not yet been inserted into a production environment. The testing phase can be quite time consuming. After the code is tested and all, if any, bugs are fixed, the code is released into production. If the code is a patch or an enhancement of a feature to an existing program (e.g., a new feature provided to an on-line service), releasing the code into production includes inserting the new code into the existing program and making it available to the end users.

As noted above, the testing portion of the cycle can be very intensive and time consuming. The examples described herein provide a technique by which the testing phase may be eliminated in at least some situations (as indicated by the "X" in FIG. 1 through the testing phase).

The disclosed technique involves the use of a supervised machine learning approach to generate a classifier which predicts a risk level with merging the software commit in to the production environment. The disclosed machine learning approach assumes that there is a common denominator to a "bad" commit, that is, a commit that introduces a bug into the production environment. The common denominator can be learned by generating a classifier based on prior commits. If the classifier deems a particular commit to be a good commit (e.g., a commit that does not introduce a bug), then the testing phase may be skipped and the commit released into production. However, if the classifier deems a particular commit to be a bad commit, further testing may be performed to fix any bugs. The classifier generates a risk level for each commit to designate the likelihood that a commit is good (bug free) or bad (likely contains a bug).

Testing may be skipped for good commits and only performed for bad commits, thereby generally reducing the amount of testing needing to be performed.

As used herein, referring to a commit as "good" means the commit is bug-free. Referring to a commit as "bad" means the commit contains a bug. The term "risk level" may indicate whether the commit is risky or not risky. That is, in some implementations, a risk level only contains two levels (risky, not risky). In other implementations, more than two risk levels are provided.

Figure 2:
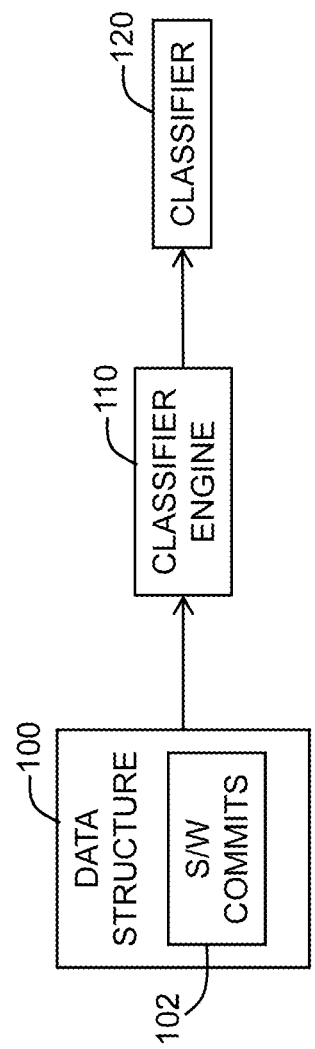
FIG. 2 shows a system for generating a classifier for use in assessing a risk level of a software commit in accordance with an example.

FIG. 2 illustrates a system that includes a data structure 100 which includes a plurality of software commits 102. Each commit has already been deemed to be good (bug free) or bad (contains a bug) based on prior actual usage of the commit in the production environment. A classifier engine 110 accesses the data structure to generate a classifier 120 based on the software commits from the data structure 100. The classifier is generated based on prior commits known to be good or bad and thus the classifier is usable to classify future commits as good or bad before such commits are actually released into production and known to be good or bad.

Figure 3:
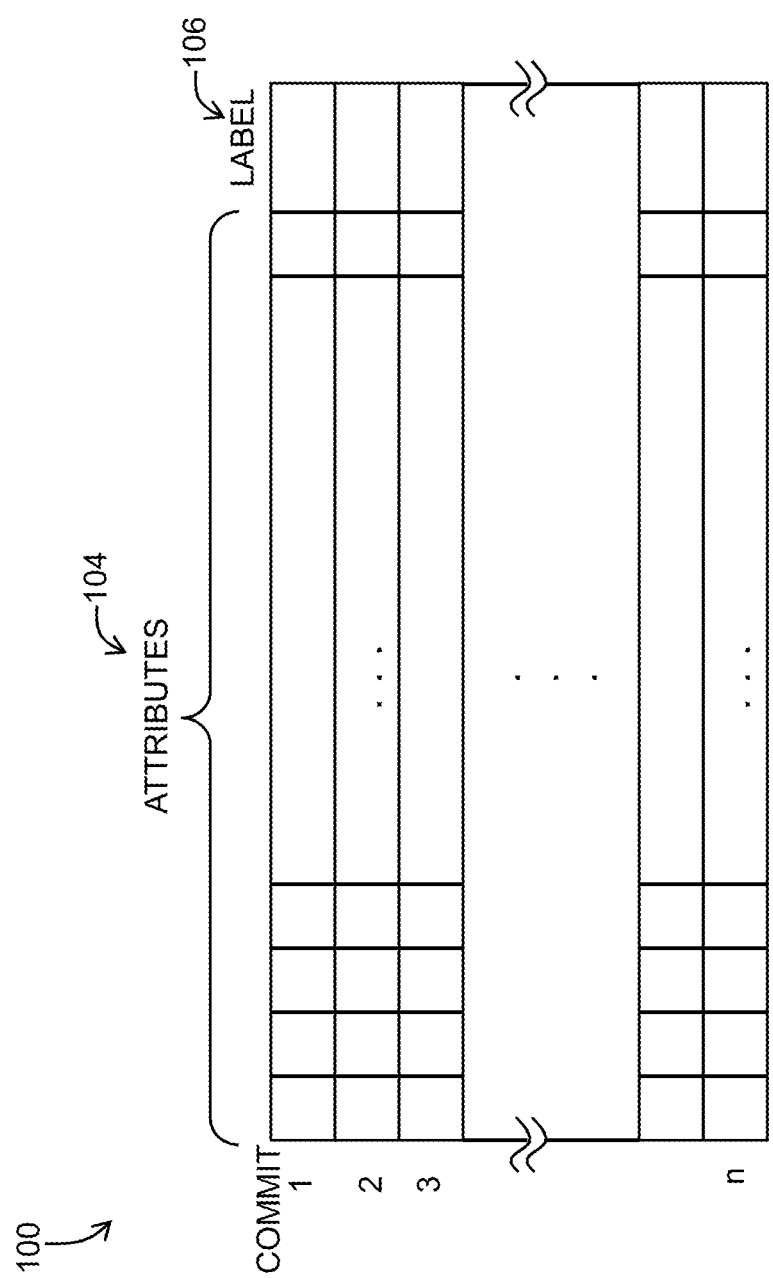
FIG. 3 illustrates a data structure in accordance with an example.

FIG. 3 provides an example of the data structure 100. As shown in FIG. 3, the data structure 100 comprises a table that includes a plurality of entries (e.g., rows). Each entry is used to store information about a separate software commit. Commits 1, 2, 3, . . . , n are illustrated in FIG. 3. Each software commit represents a piece of code that has been written by a software developer. The commits included in the data structure 100 have been previously released into production. As a result, it has been determined whether a given commit was good or not. For example, a commit for which a bug was later detected in the production environment may be deemed to have been bad while a commit for which no bug was detected may be deemed to have been good. A label 106 is assigned to each commit to indicate the success level of that commit. The label 106 may be designated as good or bad, 1 (e.g., good) or 0 (bad), or any other type of designation to indicate the success level of the commit as being good or bad. In some implementations, the label 106 may be one of three values +1, −1, or 0. The label value +1 indicates a good commit. The label value −1 indicates a bad commit. The label value 0 indicates a commit for which a technical problem prevented an assessment of the commit as being good or bad. The labels may be ascertained for a commit after its release into production and enough time has elapsed to allow an assessment of the commit as good or bad.

The commits in a given data structure 100 may be commits that pertain to different software projects. In other implementations, however, the data structure 100 may contain commits that al pertain to the same software project. For example, an on-line web service may have undergone multiple software updates. The various updates (commits) for the on-line web service are all stored in one data structure for subsequent use in estimating the risk level of a future commit for the same project. In such implementations, a separate data structure of software commits may be provided for each software project.

Each commit in the data structure 100 includes a plurality of attributes 104. The attributes include at least one attribute about the software commit. In at least some implementations, the attributes 104 do not pertain to the functionality or logic implemented by the code itself. Instead, the attributes characterize the environment associated with the software commit. Any number of attributes 104 is possible.

In some implementations, the attributes may be categorized in three classes. A first class of attributes includes attributes based on the commit itself without considering the entire project history (source control). Source control attributes include, for example, the number of days that have elapsed since the last commit for the project (project age). In general, there may be a correlation between the frequency with which a software project is updated and the likelihood of a bug. A software project that has not needed an update in a long time is generally less likely to experience a bug when an update is made as compared to a software project that has experienced a higher frequency of software updates. Another example of a source control attribute is the time of day when the commit was made. In general, commits made during normal business hours may be more reliable than commits made during off-hours.

A second class of attributes includes attributes based on the labels of the prior commits (previous labels). As explained above, a "label" is a characterization as to whether a software commit proved to be, for example, good (bug free) or bad (had a bug). The previous labels attributes include attributes pertaining to labels of prior commits such as, for example, whether the last commit had a "good" or "bad" label (label of last 1 commits), the average of the last three commits (label of last 3 commits), the minimum number of days that have elapsed since the last "good" commit of each file in the commit (last good commit days min), etc.

A third class of attributes includes attributes pertaining to the complexity of the committed code (code complexity). In general, a modification made to more complex code is more likely to result in a bug than a modification made to simpler code. Any of a variety of techniques for measuring code complexity may be used. One suitable complexity attribute, for example, is the number of lines of source code (SLOG). Other complexity metrics may include the cyclomatic complexity, Halstead complexity measures, and maintainability metrics. Cyclomatic complexity measures the number of linearly independent paths through the source code. Cyclomatic complexity may be computed using a control flow graph of the source code whose nodes correspond to indivisible groups of commands and whose directed edges connect two nodes if the second command might be executed immediately after the first command. Halstead complexity produces a difficulty measure that is related to the difficulty of the program to write or understand. The maintainability index is computed based on lines of code measures, Halstead complexity measures and possibly different or other measures. Additional or different complexity metrics are possible as well.

Table I below provides examples of various attributes, some of which are discussed above. Other implementations may use a different set of attributes.

TABLE I

| Attribute | Description | Type |
| --- | --- | --- |
| project age | Days passed since the last commit | source control |
| time of day | The hour when the commit was made. | source control |
| sin | Because we want it to be circular, calculated as: sin(hour × 2 × Pi/23), where hour is an integer between 0 and 23 | |
| time of day cos | The hour when the commit was made. Because we want it to be circular, calculated as: cos(hour × 2 × Pi/23), where hour is an integer between 0 and 23 | source control |
| day of week sin | The day of the week when the commit was made. Because we want it to be circular, calculated as: sin(day × 2 × Pi/6), where day is an integer between 0 and 6 | source control |
| day of week cos | The day of the week when the commit was made. Because we want it to be circular, calculated as: cos(day × 2 × Pi/6), where day is an integer between 0 and 6 | source control |
| lines added | How many lines were added in total | source control |
| lines removed | How many lines were removed in total | source control |
| minimal added lines | Out of all the files in the commit, what is the minimal number of lines added | source control |
| maximal added lines | Out of all the files in the commit, what is the maximal number of lines added | source control |
| average added lines | Out of all the files in the commit, what is the average number of lines added | source control |
| maximal removed lines | Out of all the files in the commit, what is the minimal number of lines removed | source control |
| minimal removed lines | Out of all the files in the commit, what is the maximal number of lines removed | source control |
| average removed lines | Out of all the files in the commit, what is the average number of lines removed | source control |
| number of files | How many files were changed in this commit | source control |
| number of sensitive files | How many files in this commit are in the "usual suspect" list | source control |
| minimal age | How old (in days) is the newest file in the commit | source control |
| maximal age | How old (in days) is the oldest file in the commit | source control |
| average age | What the average age (in days) of the files in the commit | source control |
| minimal times changed | How many changes were made to the file that changed the least | source control |
| maximal times changed | How many changes were made to the file that changed the most | source control |
| average times changed | How many changes on average were made to the files in this commit | source control |
| minimal changed frequency | What is the lowest change frequency in this commit. Change frequency is calculated as: timesTheFileChanged/fileAge | source control |
| maximal changed frequency | What is the highest change frequency in this commit. Change frequency is calculated as: timesTheFileChanged/fileAge | source control |
| average changed frequency | What is the average change frequency in this commit. Change frequency is calculated as: timesTheFileChanged/fileAge | source control |
| length of comment | How many characters in the comment for this commit | source control |
| days since last commit | How many days past since the last commit to this project | source control |
| label of last 1 commits | Was the last commit labeled as "Good" or "Bad" | previous labels |

TABLE I-continued

| Attribute | Description | Type |
|---|---|---|
| label of last 3 commits | What is the average of the labels of the last 3 commits | previous labels |
| label of last 5 commits | What is the average of the labels of the last 5 commits | previous labels |
| last good commit days min | Calculate how many days past since the last "Good" commit of each file in this commit, and return the minimum | previous labels |
| last good commit days max | Calculate how many days past since the last "Good" commit of each file in this commit, and return the maximum | previous labels |
| last good commit days avg | Calculate how many days past since the last "Good" commit of each file in this commit, and return the average | previous labels |
| last good commit count min | Calculate how many commits past since the last "Good" commit of each file in this commit, and return the minimum | previous labels |
| last good commit count max | Calculate how many commits past since the last "Good" commit of each file in this commit, and return the maximum | previous labels |
| last good commit count avg | Calculate how many commits past since the last "Good" commit of each file in this commit, and return the average | previous labels |
| last bad commit days min, | Calculate how many days past since the last "Bad" commit of each file in this commit, and return the minimum | previous labels |
| last bad commit days max | Calculate how many days past since the last "Bad" commit of each file in this commit, and return the maximum | previous labels |
| last bad commit days avg | Calculate how many days past since the last "Bad" commit of each file in this commit, and return the average | previous labels |
| last bad commit count min | Calculate how many commits past since the last "Bad" commit of each file in this commit, and return the minimum | previous labels |
| last bad commit count max | Calculate how many commits past since the last "Bad" commit of each file in this commit, and return the maximum | previous labels |
| last bad commit count avg | Calculate how many commits past since the last "Bad" commit of each file in this commit, and return the average | previous labels |
| label streak, | If the label of the last commit is X, how many commits past since the last time the label wasn't X | previous labels |
| dependency graph | The number of modules that depend on the modules that were changed | Code complexity |
| SLOCP total | Total number of source lines of code in all modules of a commit | Code complexity |
| SLOCP avg | Average number of source lines of code among the modules of a commit | Code complexity |
| SLOCP max | Max number of source lines of code in a module of a commit | Code complexity |
| SLOCL total | Total number of source lines of code in all modules of a commit | Code complexity |
| SLOCL avg | Average number of source lines of code among the modules of a commit | Code complexity |
| SLOCL max | Max number of source lines of code in a module of a commit | Code complexity |
| JSHINT total | Run a code analysis tool, see how many errors it finds | Code complexity |
| JSHINT avg | Run a code analysis tool, see how many errors it finds on average | Code complexity |
| JSHINT max | Run a code analysis tool, see what's the maximal number of errors it finds | Code complexity |
| cyclomatic (M) total | Total for all modules of commit, computed as (number of edges of control flow graph) − (number of nodes of graph) + (2)(number of connected components); connected points are exit nodes of the graph | Code complexity |
| cyclomatic (M) avg | Average cyclomatic measure across the modules of the commit. | Code complexity |
| cyclomatic ( ) max | Maximum cyclomatic measure across the modules of the commit. | Code complexity |
| Halstead length (N) total | Total number of operators + total number of operands for all modules of commit | Code complexity |
| Halstead length (N)_avg | Average length across the modules of the commit. | Code complexity |
| Halstead length (N) max | Maximum length across the modules of the commit. | Code complexity |
| Halstead vocabulary (η) total | Total number of distinct operators and distinct operands in all modules of commit | Code complexity |
| Halstead vocabulary (η) avg | Average number of distinct operators and distinct operands across the modules of commit | Code complexity |
| Halstead vocabulary (η) max | Maximum number of distinct operators and distinct operands across the modules of commit | Code complexity |
| Halstead difficulty (D) total | Difficulty measure for all modules of commit computed as (total number of distinct operators)/2 × (total number of operands)/(total number of distinct operands) | Code complexity |
| Halstead difficulty (D) avg | Average difficulty measure across the modules of commit | Code complexity |
| Halstead difficulty (D) max | Maximum difficulty measure across the modules of the commit | Code complexity |
| Halstead volume (V) total | Program length (total number of operators and operands) × $\log_2$(program vocabulary) computed for all modules of commit | Code complexity |
| Halstead volume (V) avg | Average volume across the modules of the commit. | Code complexity |
| Halstead volume (V) max | Maximum volume across the modules of the commit. | Code complexity |
| Halstead (E) effort total | Difficulty metric × Volume, computed for all modules of commit. | Code complexity |
| Halstead effort (E) avg | Average Effort computed across the modules of the commit. | Code complexity |
| Halstead effort (E) max, | Maximum Effort computed across the modules of the commit. | Code complexity |
| Halstead bugs (B) total | $Effort^{2/3}/3000$ or V/3000 | Code complexity |
| Halstead bugs (B) avg | Average number bugs across the modules of the commit | Code complexity |
| Halstead bugs B) max | Maximum number bugs across the modules of the commit | Code complexity |
| Halstead time (T) total, | E/18 seconds | Code complexity |
| Halstead time (T) avg | Average Time (T) across the modules of the commit | Code complexity |
| Halstead time (T) max | Maximum Time (T) across the modules of the commit | Code complexity |
| maintainability total | Total maintainability metric computed for all modules of the commit. | Code complexity |
| maintainability avg | Average maintainability metric across the modules of the commit. | Code complexity |
| maintainability max | Maximum maintainability metric across the modules of the commit. | Code complexity |

Figure 4:
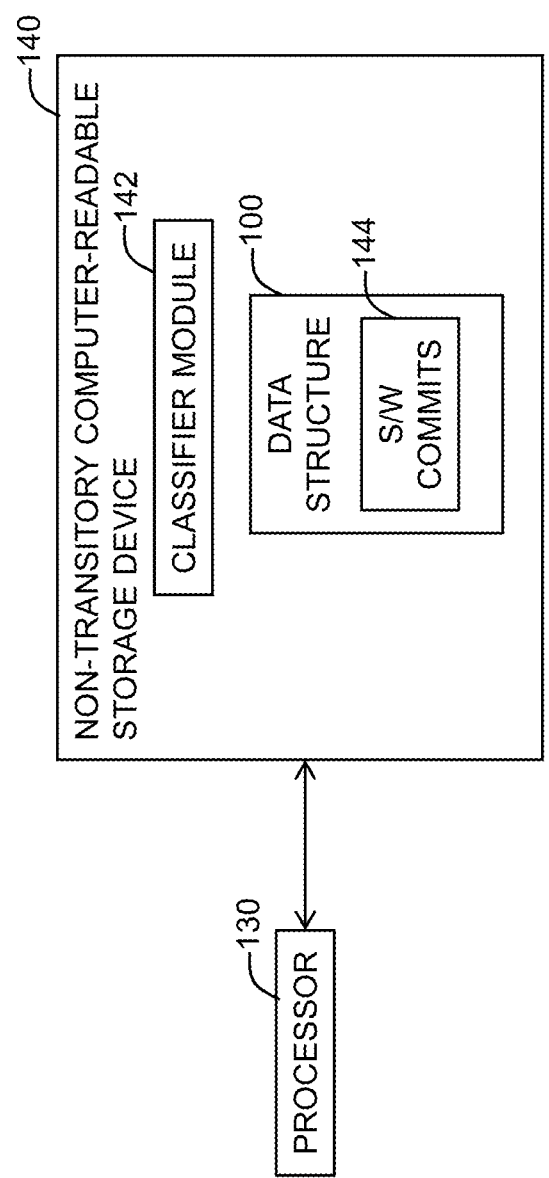
FIG. 4 illustrates another system for generating a classifier for use in assessing a risk level of a software commit in accordance with an example.

FIG. 4 is an illustrative implementation of the system of FIG. 2. FIG. 4 includes a processor 130 coupled to a non-transitory computer-readable storage device 140. The storage device 140 includes any suitable type of non-volatile storage such as random access memory (RAM), compact disk read only memory (CDROM), a hard disk drive, etc. The storage device 140 includes a classifier module 142 that includes code that is executable by the processor 130 to implement the functionality of the classifier engine 110 of FIG. 2. The storage device 140 also includes the data structure 100 in which the attributes of about software commits 144 are stored for analysis by the classifier module 142. Any functionality described herein attributed to the classifier module 142 is applicable as well to the classifier engine 110, and vice versa.

Figure 5:
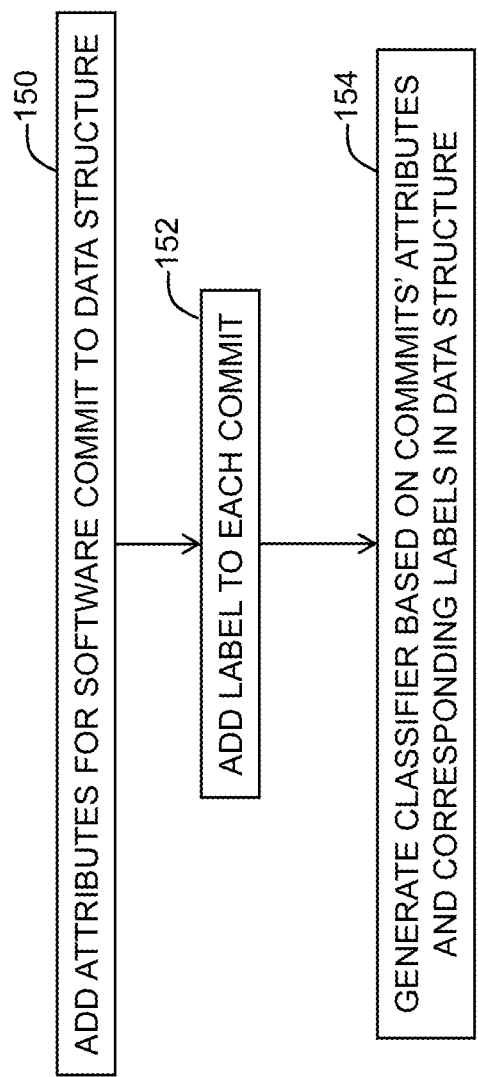
FIG. 5 shows a method for generating the classifier in accordance with an example.

FIG. 5 illustrates a method that may be implemented by the system of FIGS. 2, 4. At 150, the method includes adding attributes for a software commit to a data structure (e.g., data structure 100). The attributes to be added may be any or all of the attributes listed in Table I or different attributes as desired. For each commit whose attributes are added to the data structure, the method also includes adding a label for the commit. The label may be, for example, good (e.g., 1) or bad (e.g., 0) indicating whether or not the commit had a bug. Attributes for any number of commits can be added to the data structure.

At 154, the method includes generating a classifier based on the commits' attributes and corresponding labels in the data structure. In some examples, operation 154 is implemented as an off-line learning operation in which the data structure with the commits' attributes and labels are provided to the classifier engine 110. The classifier engine 110 may implement any suitable classifier technique such as a "leave-1-out" cross validation to generate the classifier 120. For example, for each commit in the data structure, the method removes that commit from the data structure, calculates the classifier on the remaining commits, run the newly computed classifier on the commit that was removed, and compare the risk level label returned by the classifier to the actual label of the removed commit.

Figure 6:
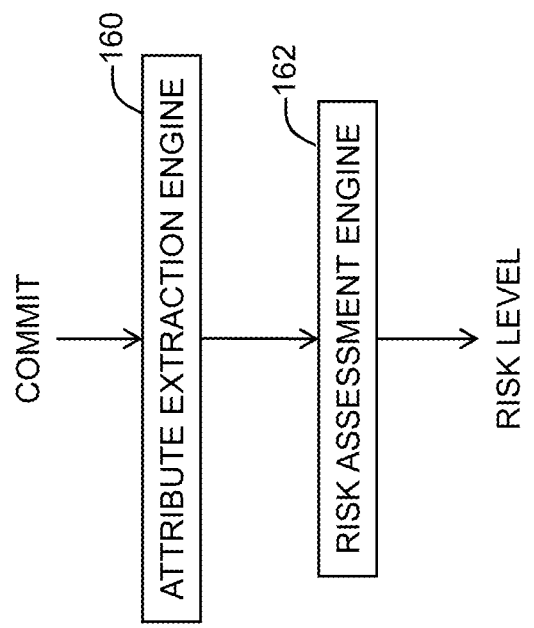
FIG. 6 illustrates a system for assessing a risk level of a software commit in accordance with an example.

Once the classifier 120 is generated, the classifier 120 can be used to assess a risk level for a given commit. The generated classifier 120 is usable to classify a new commit (i.e., a commit that is not already in the data structure or for which a label has not already been determined) as good or bad. FIG. 6 illustrates an example of a system for risk assessment of a commit. The system includes an attribute extraction engine 160 and a risk assessment engine 162. Attributes about a new commit to be analyzed are extracted by the attribute extraction engine. The extracted attributes may include at least some or all of the attributes listed in Table I. The extracted attributes are then provided to the risk assessment engine 162 which runs the previously generated classifier on the newly extracted attributes to classify the new software commit (e.g., as good or bad).

Figure 7:
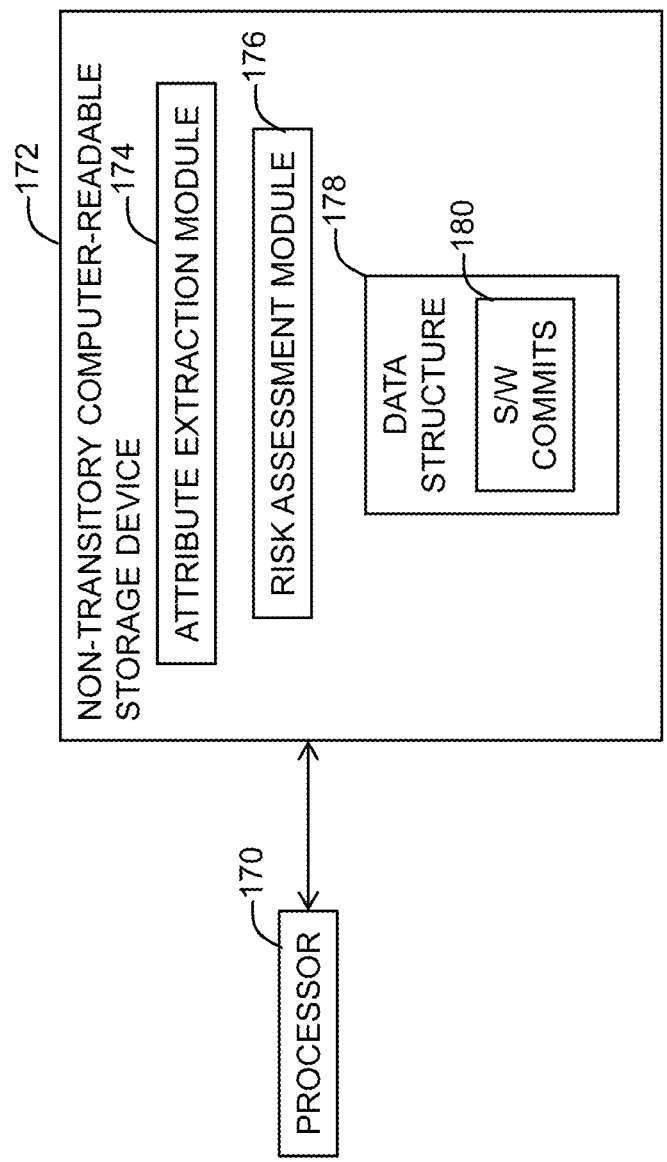
FIG. 7 illustrates another system for assessing a risk level of a software commit in accordance with an example.

FIG. 7 is an example of an implementation of the system of FIG. 6. FIG. 7 shows a processor 170 coupled to a non-transitory computer-readable storage device 172. The storage device 172 includes any suitable type of non-volatile storage such as random access memory (RAM), compact disk read only memory (CDROM), a hard disk drive, etc. The storage device 172 includes an attribute extraction module 174 and a risk assessment module that comprise code that is executable by the processor 170 to implement the functionality of the attribute extraction engine 160 and risk assessment engine 162, respectively, of FIG. 6. The storage device 172 also includes a data structure 178 in which the attributes of software commits 180 are stored for use by the risk assessment module 176 to classify a new commit. Any functionality attributed to the attribute extraction module 174 and risk assessment module 176 is applicable as well to the corresponding attribute extraction engine 160 and risk assessment engine 162, and vice versa.

Figure 8:
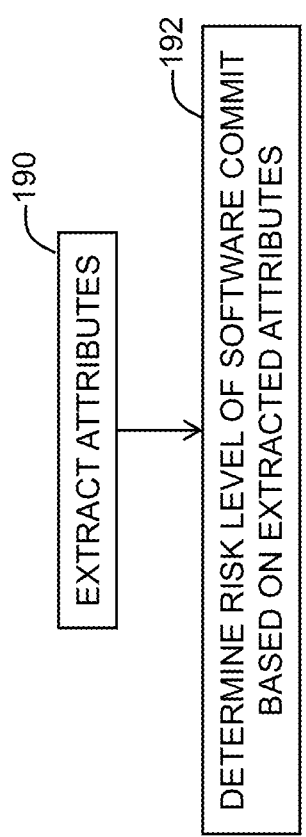
FIG. 8 illustrates a method for assessing risk in accordance with an example.

FIG. 8 shows an example of a method for assessing the risk level of a software commit. The method shown includes extracting attributes from a software commit (190). For example, some or all of the attributes listed in Table I can be extracted. At 192, the method further comprises determining a risk level of a software commit based on the extracted attributes. The classifier generated per the method of FIG. 5 may be run on the newly extracted attributes to generate the risk level.

Figure 9:
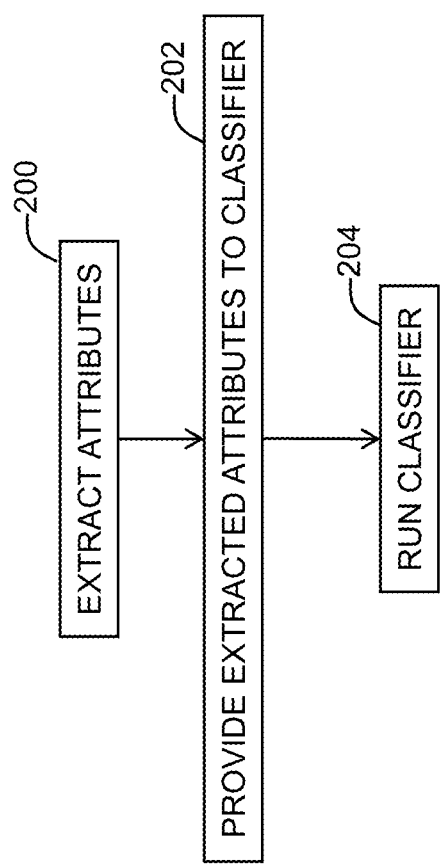
FIG. 9 illustrates another method for assessing risk in accordance with an example.

FIG. 9 shows another method in which attributes for a software commit are extracted (200) as explained above. The attributes are provided at 202 to a classifier (e.g., the classifier generated in FIG. 5). At 204, the classifier is run on the newly extracted attributes to assess the risk level for the software commit.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
generating, by a processor, a classifier for attributes of previous software commits, wherein the previous software commits are code that has already been deployed, and wherein generating the classifier includes classifying the attributes of the previous software commits into three classes: a first class based on a frequency of update of the previous software commits, a second class based on successful levels of the previous software commits, and a third class based on code complexity of the previous software commits;
extracting, by the processor, attributes pertaining to a new software commit, wherein the new software commit is code that has not been deployed; and
running, by the processor, the classifier on the extracted attributes of the new software commit to determine a risk level for deployment of the new software commit into a production environment to determine whether or not to skip a testing phase,
wherein generating the classifier of the previous software commits includes:
removing one of the previous software commits from the data structure,
calculating a classifier on the previous software commits remaining in the data structure,
running the calculated classifier on the removed software commit, and
comparing a risk level label returned by the calculated classifier to an actual risk level label of the removed software commit.

2. The method of claim 1, wherein the attributes of the new software commit include an attribute that provides information about the new software commit, an attribute that provides information about a label for the new software commit, and an attribute indicative of the code complexity of the new software commit for which the risk level is determined.

3. The method of claim 1, wherein the risk level includes a plurality of levels.

4. The method of claim 1, further comprising:
storing the previous software commits in a table of the data structure, the table including a column of the attributes of the previous software commits and a column of labels indicating the successful levels of the previous software commits.

5. A non-transitory computer-readable storage device containing instructions that, when executed by a processor, cause the processor to:
generate a classifier for attributes of previous software commits, wherein the previous software commits are code that has already been deployed;
determine a plurality of attributes pertaining to a new software commit, wherein the new software commit is code that has not been deployed; and
use the classifier to classify the attributes of the new software commit to determine a risk level for deployment of the new software commit into a production environment to determine whether or not to skip a testing phase, wherein, to generate the classifier, the instructions are to cause the processor to:
- remove one of the previous software commits stored in a data structure,
- calculate the classifier on the previous software commits remaining in the data structure,
- run the calculated classifier on the removed software commit, and
- compare a risk level label returned by the calculated classifier to an actual risk level label of the removed software commit.

6. The non-transitory computer-readable storage device of claim 5, wherein, to generate the classifier for the attributes of the previous software commits, the instructions are to cause the processor to:
- classify the attributes of the previous software commits into three classes: a first class based on a frequency of update of the previous software commits, a second class based on successful levels of the previous software commits, and a third class based on code complexity of the previous software commits.

7. The non-transitory computer-readable storage device of claim 6, wherein, when executed, the instructions are to cause the processor to validate the classifier.

8. The non-transitory computer-readable storage device of claim 5, wherein the attributes of the new software commit include an attribute that provides information about the new software commit and an attribute that provides information about a label for the new software commit.

9. The non-transitory computer-readable storage device of claim 5, wherein the attributes of the new software commit include an attribute indicative of code complexity of the new software commit for which the risk level is determined.

10. The non-transitory computer-readable storage device of claim 5, wherein the new software commit includes an update to an existing software application.

11. The non-transitory computer-readable storage device of claim 5, wherein the data structure includes a plurality of entries that store the attributes of the previous software commits and labels indicating successful levels of the previous software commits.

12. A system, comprising:
- a data structure to store a plurality of software commits that have already been deployed, each software commit in the data structure to include a plurality of attributes and a label indicating a success level of the software commit;
- a processor; and
- a memory storing instructions that when executed cause the processor to:
  - generate a classifier for the plurality of attributes of the software commits from the data structure,
  - determine an attribute of a new software commit that has not been deployed, and
  - run the classifier to classify the attribute of the new software commit to determine a risk level for deployment of the new software commit into a production environment to determine whether or not to skip a testing phase, wherein, to generate the classifier, the instructions are to cause the processor to:
- remove one of the previous software commits from the data structure,
- calculate the classifier on the previous software commits remaining in the data structure,
- run the calculated classifier on the removed software commit, and
- compare a risk level label returned by the calculated classifier to an actual risk level label of the removed software commit.

13. The system of claim 12, wherein the attribute of the new software commit includes a measure of code complexity of the new software commit for which the risk level is determined.

14. The system of claim 12, wherein to generate the classifier, the instructions are to cause the processor to classify the plurality of attributes of the software commits into three classes: a first class based on a frequency of an update of the software commits, a second class based on successful levels of the software commits, and a third class based on code complexity of the software commits.

* * * * *